(12) United States Patent
Hurich et al.

(10) Patent No.: US 7,725,644 B2
(45) Date of Patent: May 25, 2010

(54) MEMORY DEVICE AND AN ARRANGEMENT FOR PROTECTING SOFTWARE PROGRAMS AGAINST INADVERTENT EXECUTION

(75) Inventors: Martin Hurich, Ihrlerstein (DE); Wolfgang Grimm, Offenau (DE); Harry Friedmann, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 704 days.

(21) Appl. No.: 11/478,396

(22) Filed: Jun. 28, 2006

(65) Prior Publication Data
US 2006/0248589 A1 Nov. 2, 2006

Related U.S. Application Data

(62) Division of application No. 10/091,057, filed on Mar. 4, 2002, now Pat. No. 7,096,394.

(30) Foreign Application Priority Data
Mar. 2, 2001 (DE) ................................ 101 10 050

(51) Int. Cl.
*G06F 12/00* (2006.01)
(52) U.S. Cl. ........................ 711/103; 711/104; 711/163; 711/E12.008; 711/E12.091
(58) Field of Classification Search .................. 711/100
See application file for complete search history.

(56) References Cited

U.S. PATENT DOCUMENTS

| 4,000,460 | A | 12/1976 | Kadakia et al. |
| 4,221,176 | A | 9/1980 | Besore et al. |
| 4,819,237 | A * | 4/1989 | Hamilton et al. ............... 714/22 |
| 5,591,916 | A | 1/1997 | Byrne |
| 5,819,025 | A | 10/1998 | Williams |
| 5,913,022 | A | 6/1999 | Tinaztepe et al. |
| 6,195,776 | B1 | 2/2001 | Ruiz et al. |
| 6,205,407 | B1 | 3/2001 | Testa et al. |
| 6,421,773 | B1 | 7/2002 | Inagaki |
| 6,499,126 | B1 | 12/2002 | Tsuto |
| 6,769,083 | B1 | 7/2004 | Tsuto et al. |

FOREIGN PATENT DOCUMENTS

| DE | 196 16 053 | 10/1997 |
| EP | 0 923 081 | 11/1998 |

* cited by examiner

*Primary Examiner*—Reginald G Bragdon
*Assistant Examiner*—Aracelis Ruiz
(74) *Attorney, Agent, or Firm*—Kenyon & Kenyon LLP

(57) ABSTRACT

A memory device and an arrangement are provided for safeguarding safety-critical program parts against inadvertent execution. At least one program part is executed in a predetermined chronological sequence. At a certain time in the execution, a pattern is generated. At least at one later time, a check is then performed to determine whether the pattern is present. If the pattern is not present, the execution of the respective program part is terminated.

6 Claims, 3 Drawing Sheets

MEMORY DEVICE AND AN ARRANGEMENT FOR PROTECTING SOFTWARE PROGRAMS AGAINST INADVERTENT EXECUTION

CROSS-REFERENCES TO RELATED APPLICATIONS

This application is a divisional application of U.S. application Ser. No. 10/091,057, now U.S. Pat. No. 7,096,394, filed Mar. 4, 2002, and claims priority benefits under 35 U.S.C. §119 of German Patent Application Number 101 10 050.7, filed Mar. 2, 2001, the entire disclosures of which are hereby incorporated by reference.

FIELD OF THE INVENTION

The present invention relates to a memory device and an arrangement for safeguarding program parts which are critical to safety.

BACKGROUND INFORMATION

The software used in controllers and motor vehicles, for example, is becoming increasingly more complex because of constantly rising demands made on such software. This and the increasingly differentiated boundary conditions have led to a characterization of a wide variety of operating states of the software system.

It is problematic that some of these operating states are highly incompatible with one another. If program parts which are assigned to different operating states are stored at the same memory locations, inadvertent execution of a program part in the wrong operating state may lead to a condition that is critical to safety.

One example of this is the existence of an endless loop, which may be appropriate in anticipation of an external shutdown but should never be executed in the normal program sequence. During execution of such program parts, basic monitoring mechanisms such as a hardware or software watchdog are shut down or at least rendered ineffective.

It is no longer possible today to guarantee complete avoidance of the existence of such program structures. Therefore, these program parts must be protected virtually 100% against inadvertent execution.

Methods of preventing inadvertent alteration of memory contents, in particular the contents of flash EEPROM memories are widespread.

German Published Patent Application No. 196 16 053 describes a method of operating a controller having a programmable memory device. The memory device is programmed by successive execution of a plurality of memory programming control operations.

This should largely prevent in a simple manner interference-triggered, interference-influenced deletion and/or overwriting of data stored in the programmable memory device.

This is achieved by providing a check step which determines whether all the selected individual or several memory programming control operations to be carried out by then have been executed, and by a decision step in which a decision is made, taking account the result of the check, as to whether the programming operation is to be continued as intended with the execution of additional memory programming control operations.

It is, thus, possible to ascertain at any desired time whether the control operations to be carried out by then have in fact been carried out.

European Published Patent Application No. 923 081 describes methods of writing to and erasing a flash EEPROM.

In this method, a programming voltage or deletion voltage corresponds to a read voltage. To differentiate the programming or erase voltage from the read voltage, the programming or deletion algorithms are to be processed in a specific sequence using specific addresses and specific data. The programming and deletion algorithms are shifted to a volatile memory allocated logically to the flash EEPROM.

This achieves an increased security of the memory information stored in this flash EEPROM with respect to accidental overwriting or deletion.

This prevents inadvertent overwriting or deletion of stored content caused by accidental exposure of the flash EEPROM to an electromagnetic discharge, programming errors, hardware defects and/or voltage pulses.

In addition, an embodiment is also described in which the address information and data information needed for processing the programming and deletion algorithms is made available only by an external programming device.

There are no known comparable methods of protecting any desired safety-critical program parts, however.

SUMMARY OF THE INVENTION

It is the aim of the method according to the present invention to safeguard program parts, which are critical to safety, against inadvertent execution. In this method, a program having at least one program part is executed in a predetermined chronological sequence. At a certain time in the execution, a pattern is generated and a check is performed at least at one later point in time to determine whether the pattern is present. If the pattern is not present, the execution of the respective program part is terminated.

The pattern may be a single bit which is set, or a bit pattern.

The pattern is preferably generated in a volatile memory, e.g., a RAM module. This ensures that a pattern generated in a previous program run will have been deleted again after a program start.

In the method according to the present invention, it is important that in the execution of safety-critical program parts, a check is performed at least at one point in time to determine whether a pattern is present. If the pattern is not present, e.g., because the program has jumped to the safety-critical area because of a mistake in the program pointer, execution of the program part is terminated.

The memory device according to the present invention for execution of the method according to the present invention is divided into one or more sectors. A program part is stored in each sector. The program part(s) is (are) executable in a predetermined chronological sequence. The memory device according to the present invention is characterized in that an arrangement is provided for causing a pattern to be generated in execution of the program part at a certain point in time and at least one other arrangement is provided which causes a check to be performed at a later point in time to determine whether the pattern is present.

The program stored in the memory device is processed by a microprocessor.

It is advantageous for the pattern generation to be performed at the earliest possible point in time.

In addition, a program routine which causes the processor to be reset may be provided in the memory device. In the case of a defective run through the program, the program pointer skips this program routine. However, if the program pointer jumps because of an error in the program routine, the processor is reset.

Suitable data media such as EEPROMs, flash memories, as well as CD ROMs, diskettes or hard drives may be used as the memory device for executing the method according to the present invention.

DETAILED DESCRIPTION

Figure 1:
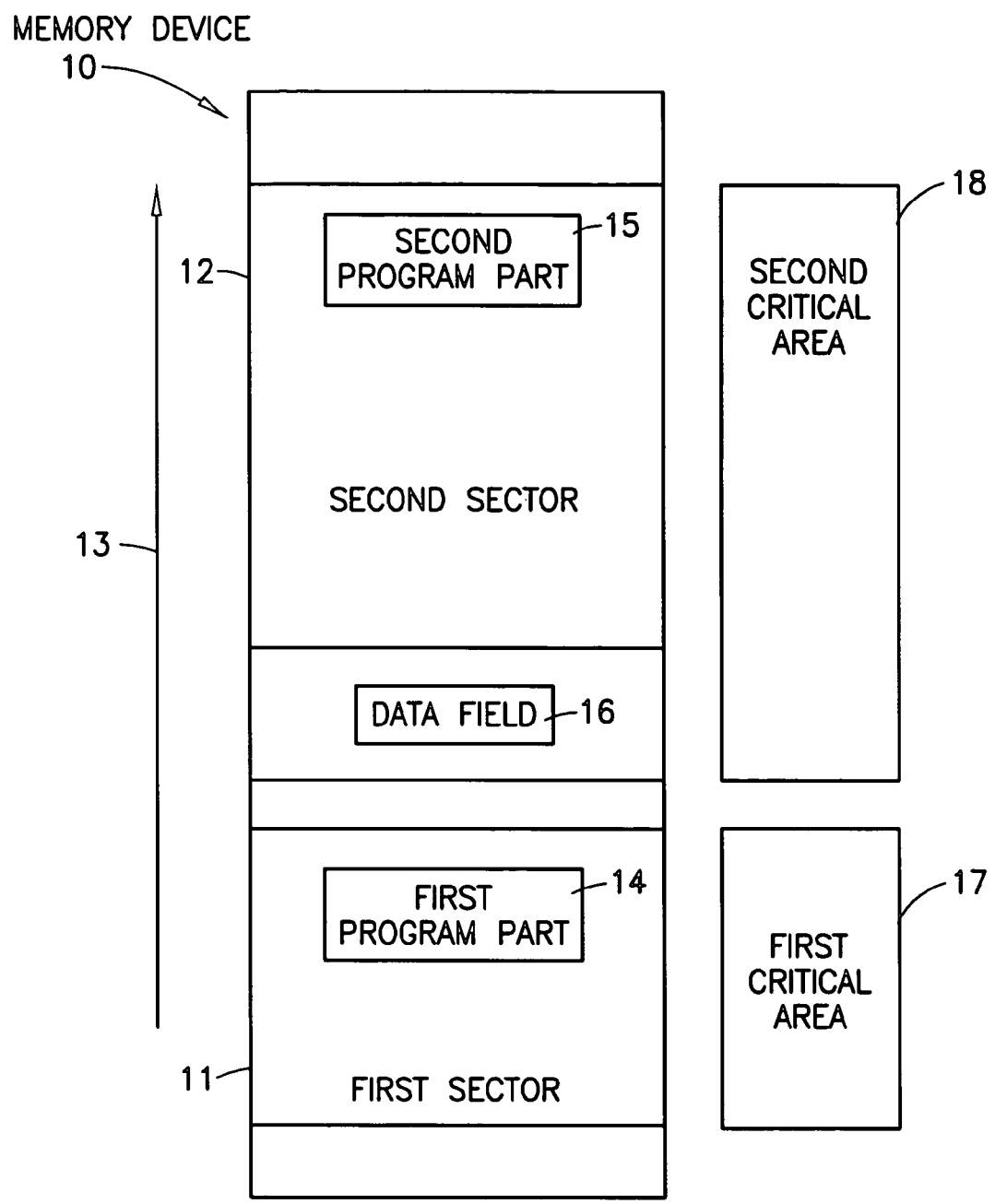
FIG. 1 is a schematic diagram showing a conventional memory device.

FIG. 1 shows a schematic diagram of a conventional memory device 10. Memory device 10 has a first area 11 and a second sector 12. An arrow 13 indicates the direction of execution. A first program part 14 is contained in first sector 11 and a second program part 15 is contained in second sector 12. In addition, data is stored in a data field 16 in second sector 12.

The second program part 15 which is provided in memory device 10 contain safety-critical routines and execution of these routines at a certain time (i.e., in a certain operating mode) is avoided.

First program part 14 and second program part 15 are designed so that second program part 15 is called up directly by first program part 14 or at least there is a fixed causal linkage between the two.

FIG. 1 shows a first critical area 17 and a second critical area 18. Critical areas 17, 18 include the parts of the memory into which inadvertent jumping of the program pointer could result in complete execution of safety-critical second program part 15.

Reasons for the extent of the critical area include:
1. If the program pointer jumps to first program part 14, this results directly or indirectly in further execution of second program part 15 and thus the safety-critical routines.
2. If the program pointer jumps to data field 16, this first results in execution of inoperative commands (data as op code) but it need not necessarily result in resetting of the processor. Therefore, there is the possibility that the program pointer might continue running up to the area of executable second program part 15, and thus the safety-critical routines might be executed.
3. If the program pointer jumps directly into second program part 15, this results in complete execution of the safety-critical routines. This may result in execution of an endless loop here, for example. To prevent this, the following procedure is used according to the present invention.

Figure 2:
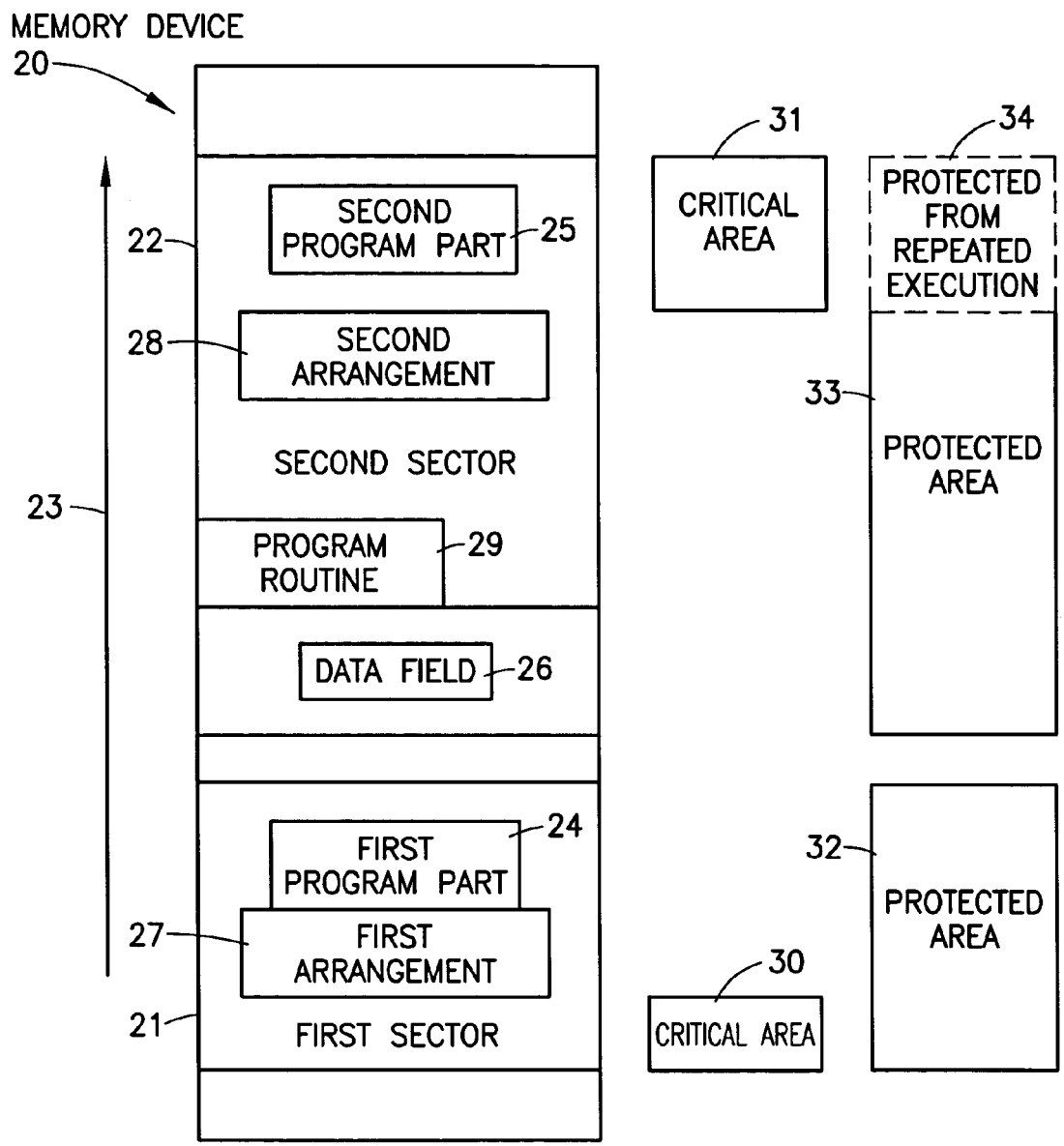
FIG. 2 is a schematic diagram showing an embodiment of the memory device according to the present invention.

FIG. 2 shows a memory device according to the present invention, diagramed schematically with reference number 20.

Memory device 20 according to the present invention has a first sector 21 and a second sector 22. An arrow 23 illustrates the direction of execution. A first program part 24 is provided in first area 21, and a second program part 25 is provided in second area 22. The second program part contains safety-critical routines.

In addition, second sector 22 includes a data field 26.

In first sector 21, a first arrangement 27 is provided, causing a pattern to be generated. First arrangement 27 may be, for example, a program routine which sets a bit or a bit pattern.

Accordingly, an arrangement 28 which performs a pattern check is provided in second sector 22. Second arrangement 28 may be, for example, a program routine which checks on whether the corresponding bit or bit pattern has been set.

In addition, a program routine 29 which causes a reset of the processor is also shown in second sector 22.

In the case of memory device 20 according to the present invention, measures are thus taken, as explained below, to prevent inadvertent execution of safety-critical second program part 25.

First, at the beginning of first program part 24, a pattern which is required for execution of second program part 25 is generated in the volatile RAM by first arrangement 27. If the program pointer jumps to first sector 21 behind first arrangement 27, initially this results directly or indirectly in further execution of second program part 25. However, execution of second program part 25 is terminated because of the absence of the pattern, which is ascertained via the check performed by arrangement 28. Inadvertent generation of the pattern is possible only if the program pointer jumps to the program sequence before execution of the pattern generation by first arrangement 27.

Thus, it is advantageous for the first arrangement 27 to generate the pattern at the earliest possible point in time in the program execution.

Furthermore, the command for resetting the processor is stored at the physical beginning of second sector 22 where safety-critical second program part 25 is located. If the program pointer jumps to data field 26, this first results in execution of inoperative commands (data as op code), as in the unprotected case, but then it need not necessarily result in resetting of the processor. Therefore, there is also the possibility that the program pointer will continue to run. On reaching program routine 29, the processor is then automatically reset, and further execution of safety-critical second program part 25 is prevented.

In the case of a faulty program run, the program pointer jumps out of first sector 21 into second sector 22 behind program routine 29.

In addition, if the program pointer jumps directly into second sector 22, this results in execution of the following safety-critical second program part 25 until the next stored check of the required pattern. Since no pattern has been generated at position 27 in sector 21, the execution of safety-critical second program part 25 at this position is terminated.

Fields 30 and 31 illustrate the critical area which has been reduced considerably in comparison with critical fields 17 and 18 from FIG. 1. Fields 32 and 33 show the protected area, and field 34 indicates the area protected from repeated execution.

If external boundary conditions (e.g., states of hardware components) are checked when the pattern is checked and when the pattern is generated, then it is possible to achieve 100% prevention of inadvertent execution of second program part 25 by a jump into this first sector 21.

For example, if execution of first program part 24 and second program part 25 depend on an external condition, then this condition, e.g., a voltage value, is additionally checked once again.

Figure 3:
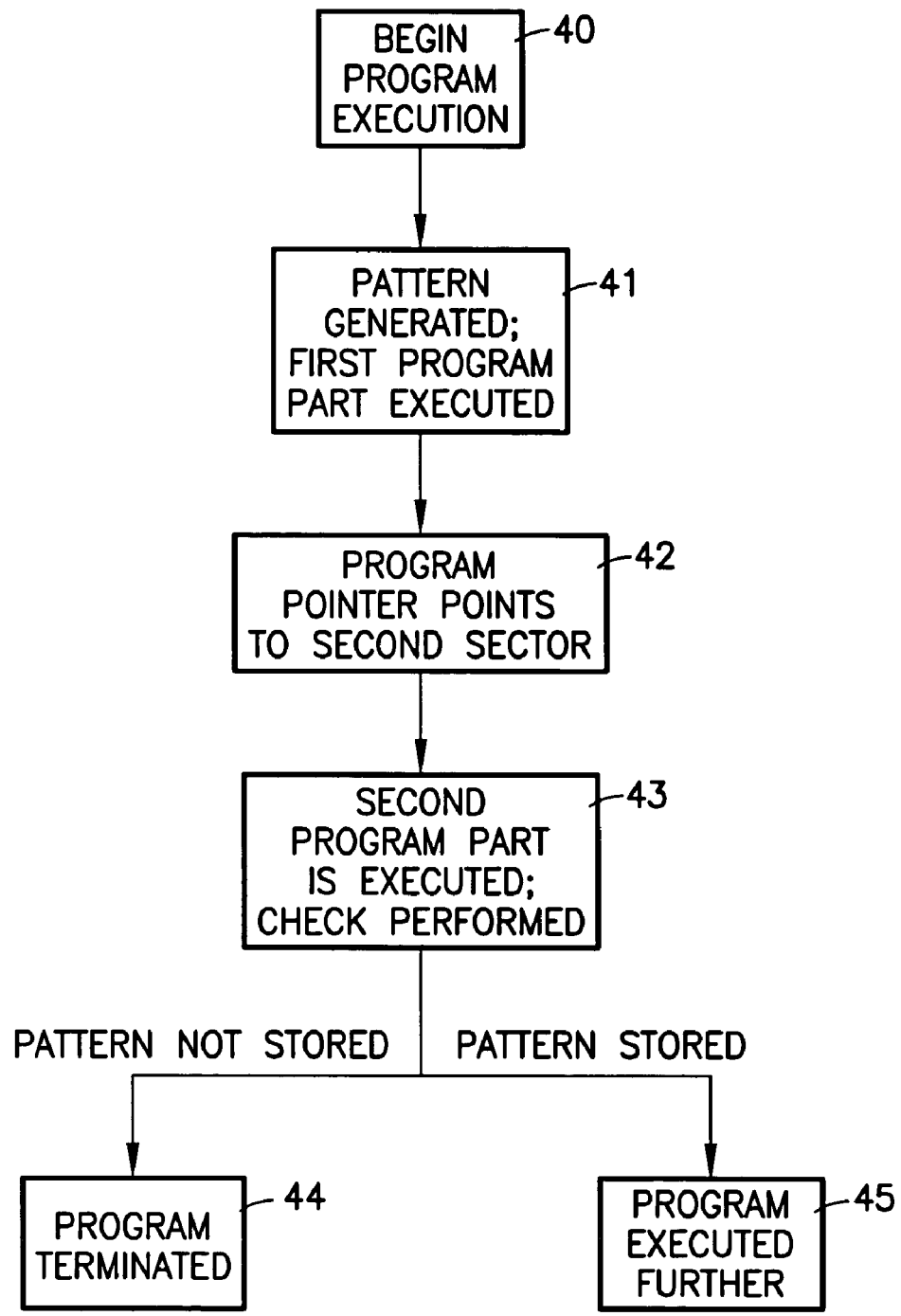
FIG. 3 is a flow chart showing the sequence of an embodiment of the method according to the present invention.

FIG. 3 illustrates the sequence of an embodiment of the method according to the present invention in a flow chart.

Execution of the program begins with a step 40. The program pointer jumps into first area 27.

In a step 41, a pattern is generated. First program part 24 which is stored in first sector 21 is executed. After the end of this program part, the program pointer jumps to second sector 22 in step 42.

In step 43, second program part 25 in second sector 22 is executed, and, in addition, a check is performed at various times to determine whether the pattern generated in first sector 21 has been stored in the RAM. If this is not the case, program is terminated in step 44. If there is a pattern, as is the case in an error-free program run, the program is executed further in step 45.

With the help of the method according to the present invention, the probability of inadvertent execution of the safety-critical program parts and the resulting malfunction of the controller may be reduced to a great extent, i.e., by orders of magnitude.

The method described here is suitable, above all, for preventing the execution of program parts which are critical to safety which are carried out cyclically. Cyclic execution may be prevented by storing a single check of the relevant pattern.

Program parts which are critical to safety, even given a single execution, may also be broken down into the smallest possible parts by performing repeated checks.

What is claimed is:

1. A device for safeguarding at least one safety-critical program part against inadvertent execution in a processor, comprising:
    a first memory sector and a second memory sector in a program memory, wherein the at least one safety-critical program part is contained in the second memory sector, and wherein at least one further program part is contained in the first memory sector, and wherein the first memory sector is configured to be executed prior to the second memory sector;
    an arrangement for executing the at least one further program part, wherein the at least one further program part includes a routine for generating a pattern; and
    an arrangement for checking whether the pattern is present, at least at one point in time after the pattern is configured to be generated, the at least one further program part being terminated if the pattern is not present;
    wherein a program code for resetting the processor is stored in a section of the program memory corresponding to a chronological execution point prior to the safety-critical program part.

2. The device of claim 1, wherein the pattern is generated at a beginning of the execution of the at least one further program part.

3. The device of claim 1, wherein the pattern is stored in a volatile memory element.

4. The device of claim 1, further comprising: an arrangement for checking an external boundary condition at the time of pattern generation and pattern checking.

5. The device of claim 4, wherein a state of a hardware component serves as the external boundary condition.

6. A device for safeguarding a safety-critical program part against inadvertent execution in a processor, comprising:
    a first memory sector and a second memory sector in a program memory, wherein the safety-critical program part is contained in the second memory sector, and wherein at least one further program part is contained in the first memory sector, and wherein the first memory sector is configured to be executed prior to the second memory sector;
    an arrangement for performing a check at least at one point in time to determine a presence of a pattern representing a proper sequence of execution, the pattern being configured to be generated using code that is included in the at least one further program part; and
    an arrangement for terminating program execution if the pattern is determined to be not present, wherein a program code for resetting the processor is stored in a section of the program memory corresponding to a chronological execution point prior to the safety-critical program part.

\* \* \* \* \*